July 13, 1965 C. F. BENSON ETAL 3,194,368
UNITARY ASSEMBLY OF OVERRUNNING CLUTCH AND BEARING
Filed May 6, 1963
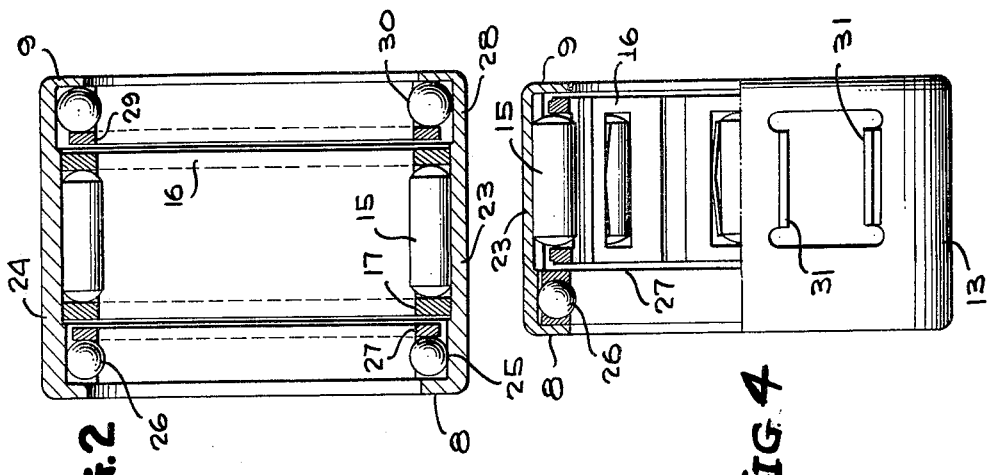
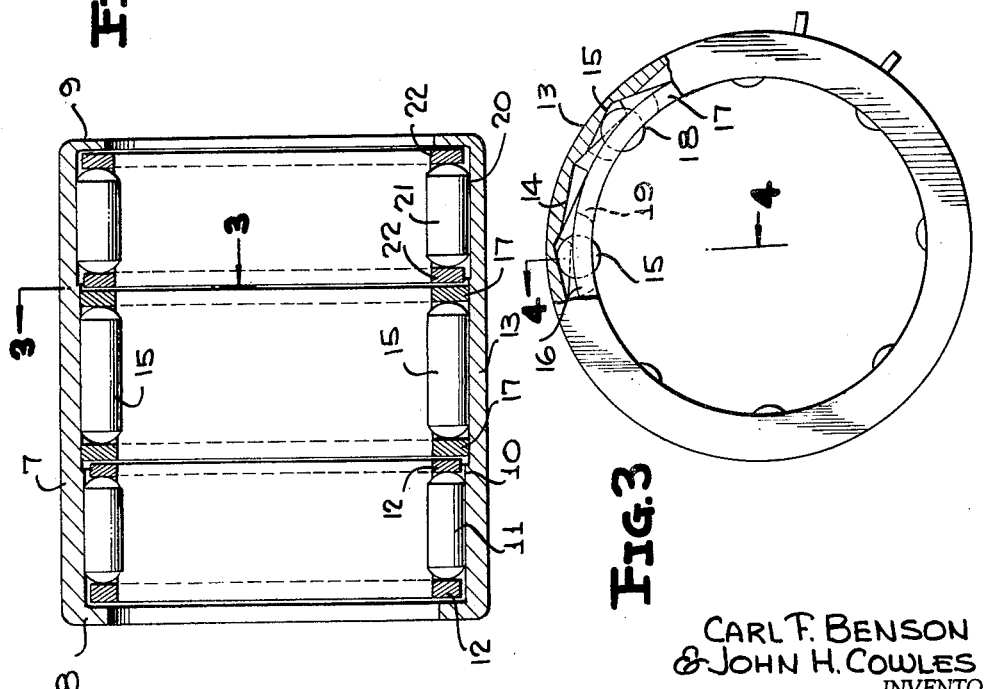
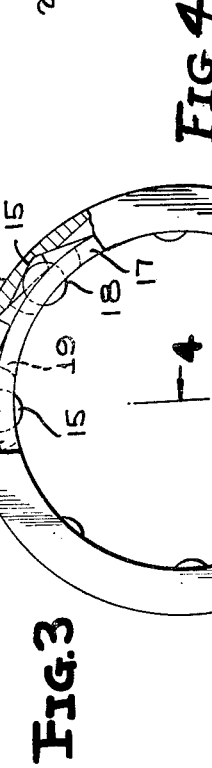
CARL F. BENSON
& JOHN H. COWLES
INVENTORS
ATTORNEYS – # United States Patent Office 3,194,368
Patented July 13, 1965

3,194,368
UNITARY ASSEMBLY OF OVERRUNNING
CLUTCH AND BEARING
Carl F. Benson, Torrington, and John H. Cowles, Forestville, Conn., assignors to The Torrington Company, Torrington, Conn., a corporation of Maine
Filed May 6, 1963, Ser. No. 278,140
3 Claims. (Cl. 192—45)

The following specification describes in detail an improved unitary assembly of overrunning roller clutch and roller bearing.

An overrunning roller clutch has limited stability and for best efficiency should be supported other than by the clutch elements themselves. This support is best provided independent of the clutch elements.

One of the objects of this invention is to increase the stability of an overrunning roller clutch by providing a bearing support or supports independent of the overrunning clutch.

It is a further object of the invention to combine both the overunning clutch and the reinforcing bearings in a single assemblage which may be installed as a unit.

It is a further object of the invention to provide assemblies of an overrunning clutch and a roller bearing which have a minimum over-all diameter and can be readily installed as by a friction fit in a minimum space.

Among the objects of the invention is to provide the overrunning clutch which when freely mounted on a rotary shaft will have means to actuate external mechanisms.

Other objects of the invention will be evident from the following description of the preferred form of the invention illustrated for the purpose of example only on the following drawings in which:

FIGURE 1 is a longitudinal vertical section of the improved multiple race roller clutch.

FIGURE 2 is a similar view of a modified form;

FIGURE 3 is an enlarged fragmentary transverse vertical section on the line 3—3 of FIGURE 1 and FIGURE 4 is a similar fragmentary transverse vertical section on the line 4—4 of FIGURE 3.

Briefly described, the novel bearing and overrunning roller clutch assembly is formed of a single shell or clutch member, which may be drawn from sheet metal to form a generally cylindrical article except for the internal surface of the clutch section which has multiple cam surfaces. This article forms the outer member of a clutch and also a housing or outer raceway for one or more additional radial support bearings to keep the clutch substantially concentric with the shaft it encloses.

On the drawings, the unitary shell body member 7 is of sheet metal drawn into generally cylindrical shape having a uniform external diameter with ends 8 and 9 which are extended in the plane of the clutch member itself.

This clutch member 7 has at one end a cylindrical outer race member 10 for a roller bearing. The raceway 10 contains a complement of rollers 11. The rollers as shown are disposed around the raceway in a retainer 12.

Alternately, a full complement of rollers 11 may be contained in the raceway, with means provided to retain them from dislodging when an inner raceway or shaft is absent.

The inner diameter of the path of the rollers 11 is substantially the same as the outside diameter of the shaft on which it is mounted and which in turn provides the inner raceway for the roller bearing.

Adjacent raceway 10, the body 7 is formed as a clutch member 13 having cam faces 14. These cam faces form spaces between which clutch rollers 15 are received. It will be readily understood that in forming the body or shell 7 by drawing, the inner diameter of the cam faces must be equal to or greater than the diameter of the raceway 10. In like manner, the minimum inner diameter of the cam faces will be greater than the diameter of the outer raceway 10.

The clutch member 13 receives a retainer 16 which is formed for example of molded plastic. This retainer has ends 17, 17. The ends have a series of teeth 18 projecting outwardly from the retainer proper and fitting within the space between the cam faces of the clutch member 13.

The ends 17, 17 of the retainer are connected by a series of spaced bars 19. These bars form intervening pockets in which the rollers 15 are held.

In the form shown in FIGURE 1, the strengthening or reinforcing or stabilizing roller bearing on one side of the clutch element is balanced by a similar roller bearing on the opposite side. Thus a second cylindrical raceway 20 adjoins the clutch member 13. It will be obvious that as a practical matter and in the operation of drawing the shell 7, it is necessary that the minimum inner diameter of the raceway 20 must exceed the maximum diameter of the clutch member 13. In other words, there is a stepped arrangement between the raceways 10, 13 and 20.

This structure lends itself to formation by drawing or coining the body 7 from sheet metal or a tube in a single operation.

A complement of rollers 21 is held on the raceway 20. The rollers are shown disposed in a cage retainer 22.

The diameters of the rollers 11, 15 and 21 are designed so as to accept a shaft or other element having a uniform diameter throughout within the bearing and clutch. It follows therefore that due to the stepped arrangement of the raceways 10, 13 and 20, the rollers 15 have greater diameter than the rollers 11, and the rollers 21 in turn have greater diameter than the rollers 15.

FIGURE 2 shows a modified form of a balanced or stabilized roller clutch. In this instance the body or shell 24 at the center is formed with a cammed surface similar to the cammed surface 13. It contains the cam rollers 15 and retainer 16 having end rings 17, 17.

Adjacent to the outer clutch member 23, the body 24 is formed with a cylindrical bearing raceway 25 of lesser diameter than the minimum diameter of the cammed clutch member 23. A series of bearing balls 26 is carried on the raceway 25. These are carried in an open end cage 27 next to the end ring 17. Outside of the bearing balls 26 is the inwardly directed flange or end 8. At the opposite end, the body 24 is expanded internally to provide an outer raceway 28. This has an inner diameter greater than the maximum diameter of the inner cammed surface of the clutch member 23.

An end cage 29 adjacent the end ring 17 holds a series of balls 30. The balls 30 are confined by an inwardly turned flange 9 of the body 24.

Irrespective of whether the antifriction members on the outer ends are rollers such as 11 and 21, or balls such as 26 and 30, they perform the same service of stabilizing the clutch when in position.

In FIGURE 4, the clutch unit is flanked on one side only with a stabilizing ball bearing unit. This is the same as shown in FIGURE 2 having a cylindrical raceway 25 receiving bearing balls 26 in a retainer 12. An end flange 8 confines the bearing members.

The clutch is intended to be mounted upon a revolvable shaft of uniform diameter which will form the inner clutch member and the inner race members for the antifriction bearings. External support is generally derived by pressing the clutch outer member into a housing, gear, pulley or the like.

Referring to FIGURES 3 and 4 it will be noted that outer clutch member 13 has its circumferential surface punched out to form an aperture having two spaced lugs 31, 31. These lugs are advantageous additions to the outer clutch members 13 or 23 when no external strengthening housing is used. This type of clutch engages with one direction of rotation of the shaft and slips or overrides in the opposite direction. In the clutch engagement direction, the clutch engages and rotates with the shaft, so that lugs 31, 31 of shell 13 cause movement or actuate any contacting or connected member of an external mechanism.

The invention has been described in its preferred form solely by way of example. Desired changes in design, proportions and materials are possible without departing from the scope of the invention as defined in the following claims.

What we claim is:

1. An overrunning roller clutch particularly adapted for mounting on a one-piece single diameter inner race, said roller clutch comprising a homogeneous thin metal outer shell having a cylindrical outer surface configuration and radially inwardly directed end flanges at the opposite ends thereof, said shell having an inner surface defining a first outer raceway adjacent one end flange and a second outer raceway axially spaced from said first outer raceway and being disposed adjacent the other of said end flanges, each of said outer raceways being of a cylindrical configuration and said second raceway being of a greater diameter than said first raceway, said shell inner surface also including an intermediate portion having clutch cams, said intermediate portion having an over-all inner diameter which is greater than the diameter of said first raceway and less than the diameter of said second raceway, a retainer within said intermediate portion and each outer raceway, and a series of rolling bearing elements in each retainer, all of said rolling bearing elements having a radially innermost surface disposed in a single cylindrical pattern.

2. An overrunning roller clutch particularly adapted for mounting on a one-piece single diameter inner race, said roller clutch comprising a homogeneous thin metal outer shell having a cylindrical outer surface configuration and radially inwardly directed end flanges at the opposite ends thereof, said shell having an inner surface defining a first outer raceway adjacent one end flange and a second outer raceway axially spaced from said first outer raceway and being disposed adjacent the other of said end flanges, each of said outer raceways being of a cylindrical configuration and said second raceway being of a great diameter than said first raceway, said shell inner surface also including an intermediate portion having clutch cams, said intermediate portion having an over-all inner diameter which is greater than the diameter of said first raceway and less than the diameter of said second raceway, a retainer within said intermediate portion and each outer raceway, and a series of rolling bearing elements in each retainer, the series of rolling bearing elements in said second outer raceway being of a greater diameter than the series of rolling bearing elements in said first outer raceway, and the series of rolling bearing elements in said intermediate portion being of an intermediate diameter with all of said rolling bearing elements having a radially innermost surface disposed in a single cylindrical pattern.

3. An overrunning roller clutch comprising a unitary thin metal outer shell having a clutch portion and an adjacent outer raceway, a retainer within the clutch portion, rollers carried by the retainer, a second retainer within the adjacent outer raceway, and antifriction means carried by said second retainer, said shell having an opening in its outer wall and with the opposite side edges of the shell around the opening projecting outwardly to form parallel lugs.

References Cited by the Examiner
UNITED STATES PATENTS

| | | | |
|---|---|---|---|
| 1,724,983 | 8/29 | Weiss | 192—45 |
| 2,082,842 | 6/37 | Marland | 192—45 |
| 2,181,700 | 11/39 | Leichsenring. | |
| 2,292,988 | 8/42 | Bloomfield et al. | 192—45 |
| 2,691,435 | 10/54 | Klamp | 192—45.1 |
| 2,798,771 | 7/57 | Douglas | 29—159.3 |
| 2,815,838 | 12/57 | Dodge | 192—45 |
| 2,997,145 | 8/61 | Ross | 192—6 |
| 3,011,606 | 12/61 | Ferris et al. | 192—45 |
| 3,055,472 | 9/62 | Sauzedde | 192—45 |
| 3,086,632 | 4/63 | Wade et al. | 192—45 |

FOREIGN PATENTS

| | | |
|---|---|---|
| 196,171 | 4/23 | Great Britain. |

DAVID J. WILLIAMOWSKY, *Primary Examiner.*